3,546,187
OIL- AND WATER-REPELLENT
POLYMERIC COMPOSITIONS
Thomas K. Tandy, Jr., Newark, Del., assignor to E. I. du
Pont de Nemours and Company, Wilmington, Del., a
corporation of Delaware
No Drawing. Filed Mar. 10, 1969, Ser. No. 805,814
Int. Cl. C08f 15/26
U.S. Cl. 260—80.76                                22 Claims

ABSTRACT OF THE DISCLOSURE

An oil- and water-repellent polymer consisting essentially of:
(a) from 75% to 98% by weight of units derived from monomers of structure $R_fCH_2CH_2O_2CCH=CH_2$ wherein $R_f$ is a perfluoroalkyl group of from four to fourteen carbons;
(b) from 25% to 2% by weight of units derived from monomers selected from the class consisting of
  (1) $ROCH=CH_2$ wherein R is selected from $X(CF_2)_n-CH_2-$, X being F or H and $n$ one or two, and $(CF_3)_2CH-$, and
  (2) $R'OCF=CF_2$ wherein R' is selected from R, as defined above, and $F(CF_2)_m-$, $m$ being from one to three; and
(c) from 0% to 5% by weight of units derived from monomers selected from the class consisting of
  (1) $CH_2=CR^2CONHR^3OH$,
  (2) $CH_2=CR^2CO_2R^4OH$, and
  (3) $CH_2=CR^2CO_2R^5$ wherein $R^2$ is H or $CH_3$, $R^3$ is an alkylene group of from one to about four carbons, $R^4$ is an alkylene group of from two to about four carbons and $R^5$ is epoxyalkyl of at least three carbons; or
  (4) mixtures of the above;
and wherein the total percent by weight of units present in the copolymer is 100%.

Preferably the polymers have an inherent viscosity as 0.5% solutions in trichlorotrifluoroethane at 30° C. not in excess of 0.8, and most preferably in the range of 0.1 to 0.35.

BACKGROUND OF THE INVENTION

This invention is concerned with new fluorinated oil and water repellents for textiles. More specifically, the invention is directed to such polymers containing

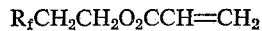

$R_fCH_2CH_2O_2CCH=CH_2$ and trifluoroethyl vinyl ether.

A wide variety of fluorine-containing polymeric materials are known to be useful for treating textiles to render the textiles oil and water repellent. Such fluorinated polymers usually have their fluorine in the form of pendent perfluoroalkyl groups as fluorine attached to the polymer backbone does not, in general, greatly contribute to oil and water repellency. While oil and water repellency of a good degree can be obtained and can be made durable to laundering and dry-cleaning, the known oil- and water-repellent fluorinated polymers are deficient in several respects. Some of these deficiencies have limited commercial acceptance of textiles treated with fluorinated oil and water repellents.

The deficiencies are discussed in the immediate paragraphs below.

First, most if not all of these fluorinated polymer-treated textiles lose their oil and water repellency after laundering when the textile is dried in air at ambient temperatures. The repellency can in large part be restored by heating as, for example, during pressing or during drying in a heated drier. This lack of repellency after the so-called home wash-air dry laundering has greatly affected usefulness of the fluorinated oil and water repellents in the permanent press garment market, for example, where the entire purpose of the permanent press treatment is to obviate the necessity for pressing or heated drying. A second facet of this problem is, of course, that the laundered fabrics lack any protection provided by oil repellency in particular between laundering and the pressing or heated drying which otherwise restores repellency. The polymers of this invention continue to impart oil and water repellency to textiles after laundering and air drying.

Second, all of the presently known fluorinated oil- and water-repellent polymer systems require a rather high temperature cure after application to develop repellency. The permanent press resins used in textiles also require rather high temperature cures but such cure cannot be applied until after the textile is converted into the final form of the garment and the desired creases applied. Thus, textiles treated with permanent press resins and presently available oil and water repellents cannot be cured until the garment is complete and therefore do not have any oil- and water-repelling properties until the garment is complete. Consequently, a large amount of such textile is soiled by oils and greases during garment manufacture without any benefit being gained from the oil and water repellent. Textile and garment manufacturers would like their permanent press treated fabric to be oil and water repellent during garment manufacture. The polymers of this invention allow fabrics treated with such polymers to be cured at a low temperature without curing any crease-resistant resin present.

A third deficiency of fabrics treated with present oil- and water-repellent polymers is that of oily-soiling retention. Oil repellent fabrics, of course, tend to repel oily stains but it is impossible to make them completely resistant to oily stains under all conceivable conditions. For example, oily stain will be forced into a fabric if sufficient pressure is applied even though the fabric will repel the oily stain when no pressure is applied. During cutting and sewing operations, for example, fabrics can come into contact with oily materials under pressure. Such soiled fabrics containing an oil and water repellent are more difficult to clean because the fabric tends to repel the cleaning medium also (detergent containing water). Such fabrics are said to lack oily soil washability. The polymers of this invention have better oily soil washability than presently used polymers.

A fourth deficiency of present oil and water repellents is that they have poor ability to resist abrasion. Most fabrics undergo a good deal of abrasive action during their lifetime. Rubbing during flexure or laundering, sliding of two fabrics together, for example on upholstery, and a variety of other mechanisms all tend to abrade the surfaces of fibers in a fabric. Most, if not all, of the presently known fluorinated oil and water repellents are not particularly resistant to abrasion. Most fabrics, therefore, sooner or later lose their coating of oil and water repellent, especially at points of greatest wear and hence lose their repellency to soiling by oil- or water-based materials at these same points. The polymers of this invention resist such abrasive action more than present oil- and water-repellent polymers.

Additional deficiencies of present oil and water repellents include lack of durability of the repellent upon laundering or dry cleaning and lack of repellency toward dry-soiling, i.e., toward particulate matter. The polymers of this invention possess good durability and repellency toward dry-soiling.

SUMMARY OF THE INVENTION

An oil- and water-repellent polymer consisting essentially of:

(a) from 75% to 98% by weight of units derived from monomers of structure $R_fCH_2CH_2O_2CCH=CH_2$ wherein $R_f$ is a perfluoroalkyl group of from four to fourteen carbons;

(b) from 25% to 2% by weight of units derived from monomers selected from the class consisting of
  (1) $ROCH=CH_2$ wherein R is selected from $X(CF_2)_n-CH_2-$, X being F or H and n one or two, and $(CF_3)_2CH-$, and
  (2) $R'OCF=CF_2$ wherein R' is selected from R, as defined above, and $F(CF_2)_m-$, m being from one to three; and (c) from 0% to 5% by weight of units derived from monomers selected from the class consisting of
  (1) $CH_2=CR^2CONHR^3OH$,
  (2) $CH_2=CR^2CO_2R^4OH$, and
  (3) $CH_2=CR^2CO_2R^5$ wherein $R^2$ is H or $CH_3$, $R^3$ is an alkylene group of from one to about four carbons, $R^4$ is an alkylene group of from two to about four carbons and $R^5$ is epoxyalkyl of at least three carbons; or
  (4) mixtures of the above;

and wherein the total percent by weight of units present in the copolymer is 100%.

Preferably the polymers have an inherent viscosity as 0.5% solutions in trichlorotrifluoroethane at 30° C. not in excess of 0.8, and most preferably in the range of 0.1 to 0.35.

DESCRIPTION OF THE INVENTION

The polymers of this invention contain two essential ingredients. The first is a monomer of structure $$R_fCH_2CH_2O_2CCH=CH_2$$

wherein $R_f$ is a perfluoroalkyl group of from four to fourteen carbons. From 75% to 98% by weight of such monomer must be present in the polymer. The second essential monomer is chosen from $ROCH=CH_2$ where R is $X(CF_2)_nCH_2-$, X being H or F and n being one or two or $(CF_3)_2CH-$, and $R'OCF=CF_2$, R' is R, that is $X(CF_2)_nCH_2-$ or $(CF_3)_2CH-$, or $F(CF_2)_m-$, m being from one to three. From 2 to 25% by weight of this monomer is used.

In the monomers $R_fCH_2CH_2O_2CCH=CH_2$, the perfluoroalkyl group $R_f$ is preferably a straight chain group $F(CF_2)_s$ where s is from 4 to 14, but may also be branched perfluoroalkyl such as $(CF_3)_2CF(CF_2)_{s'}$ where s' is from one to 11. In the preferred form of this invention, $R_f$ is a mixture of perfluoroalkyl groups $F(CF_2)_s$ where s is predominantly 6, 8 and 10.

The monomers $R_fCH_2CH_2O_2CCH=CH_2$ are prepared by esterifying the alcohols $R_fCH_2CH_2OH$ by one of several means, for example, reaction with acrylyl chloride in the presence of a tertiary amine, reaction with acrylic acid in the presence of either an acid catalyst such as sulfuric or toluenesulfonic acids or a tetraalkyl titanate (Werber, U.S. Pat. 3,056,818), or by transesterification of the alcohols $R_fCH_2CH_2OH$ with an alkyl acrylate such as the methyl or ethyl esters in the presence of an acid or a tetraalkyl titanate (Haslam, U.S. Pat. 2,822,348). The alcohols $R_fCH_2CH_2OH$ are known compounds, see for example Day, U.S. Pat. 3,283,012.

The monomers $R_fCH_2CH_2O_2CCH=CH_2$ may also be prepared by reaction of the iodides $R_fCH_2CH_2I$ with an alkali metal salt of acrylic acid, using the procedure of Fasick, U.S. Pat. 3,239,557.

It is essential in this invention that the acrylic acid ester monomers $R_fCH_2CH_2O_2CCH=CH_2$ be used. The corresponding methacrylic acid esters $$R_fCH_2CH_2O_2CC(CH_3)=CH_2$$

do not result in polymers giving the desired results. The acrylic acid esters must also have the two methylene groups between $R_f$ and the ester carbonyl group. For when either of the known groups of acrylic acid esters $R_fCH_2O_2CCH=CH_2$ (U.S. Pat. 2,642,416) or $$R_f(CH_2)_pO_2CCH=CH_2$$

p=3 or more (U.S. Pat. 3,102,103) is substituted for the monomers $R_fCH_2CH_2O_2CCH=CH_2$, the desired results are again not obtained.

The other essential monomer in the present polymers is the vinyl ethers $ROCH=CH_2$ or $R'OCF=CF_2$.

The monomers $ROCH=CH_2$ may be any one of $X(CF_2)_nCH_2OCH=CH_2$, X=F or H, n=1 or 2, or $(CF_3)_2CH-OCH=CH_2$. This group of monomers includes $CF_3CH_2OCH=CH_2$, $CF_3CF_2CH_2OCH=CH_2$, $HCF_2CH_2OCH=CH_2$, $HCF_2CF_2CH_2OCH=CH_2$ and $(CF_3)_2CHOCH=CH_2$. Of this group, the preferred monomers are $CF_3CH_2OCH=CH_2$ and $$CF_3CF_2CH_2OCH=CH_2,$$

particularly the former.

These vinyl ethers are prepared from the corresponding alcohols $CF_3CH_2OH$, $CF_3CF_2CH_2OH$, $$HCF_2CF_2CH_2OH$$

or $(CF_3)_2CHOH$, all of which are known compounds. Some, such as $CF_3CH_2OH$, $HCF_2CF_2CH_2OH$ and $(CF_3)_2CHOH$ are commercially available. The preferred monomer $CF_3CH_2OCH=CH_2$ is also commercially available. The vinyl ethers are prepared by either reaction of the alcohol with acetylene, such as is taught by Shukys in U.S. Pat. 2,830,007, or by reaction with commercially available divinyl ether in the presence of an acid catalyst, forming byproduct acetaldehyde. Another known method is thermal cracking of the acetals $CH_3CH(OR)_2$ as taught in U.S. Pats. 2,870,218 and 2,872,487.

The monomers $R'OCF=CF_2$ may be one of $$X(CF_2)_nCH_2OCF=CF_2, X=H \text{ or } F, n=1 \text{ or } 2$$
$$(CF_3)_2CHOCF=CF_2 \text{ or } F(CF_2)_mOCF=CF_2$$

m=1–3. This group of monomers includes $$CF_3CH_2OCF=CF_2, CF_3CF_2CH_2OCF=CF_2$$
$$CHF_2CH_2OCF=CF_2, CHF_2CF_2CH_2OCF=CF_2$$
$$(CF_3)_2CHOCF=CF_2, CF_3OCF=CF_2$$
$$CF_3CF_2OCF=CF_2 \text{ and } CF_3(CF_2)_2OCF=CF_2$$

Most of these monomers are also known. Those containing the methylene group $-CH_2-$ adjacent to oxygen are prepared by reaction of the sodium salt of the alcohols $X(CF_2)_nCH_2OH$ or $(CF_3)_2CHOH$ with tetrafluoroethylene, as taught by Dixon in U.S. Pat. 2,917,548. The monomers $F(CF_2)_mOCF=CF_2$ are prepared by a different route. The most convenient method is that taught by Harris and McCane in U.S. Pat. 3,132,123, namely reaction of an acid fluoride $F(CF_2)_{m-1}COF$ with cesium fluoride and hexafluoropropylene oxide to form $$F(CF_2)_mOCF(CF_3)COF$$

hydrolysis to the acid $F(CF_2)_mOCF(CF_3)CO_2H$ followed by pyrolysis of the acid to the olefin $$F(CF_2)_mOCF=CF_2$$

Other references teaching reaction of acid fluorides $$F(CF_2)_{m-1}COF$$

with hexafluoropropylene oxide are Moore et al., U.S. Pat. 3,250,808 and Moore, French Pat. 1,362,548. Other disclosures of conversion of the acids or acid fluorides to olefines are contained in Fritz et al., U.S. Pat. 3,114,778; Fritz et al., U.S. Pat. 3,291,843, Lorenz, U.S. Pat. 3,321,532; Harris and McCane, U.S. Pat. 3,180,895.

It is essential in the present invention that at least 2% by weight of the monomers $ROCH=CH_2$ or $R'OCF=CF_2$ and no more than 25% of such monomers be present. If less than 2% or more than 25% of such monomers are present, the desirable properties of the polymers are no longer obtained. The preferred concentration of these monomers is in the range of 3 to 10%.

Although it has not been found to be essential, it is often desirable to include in the polymers of this invention small amounts of certain monomers which can lead to greater durability to dry-cleaning and laundering. These monomers are preferably N-hydroxyalkyl acrylamides of structure $CH_2=CR^2CONHR^3OH$, hydroxyalkyl acrylic esters of structure $CH_2=CR^2CO_2R^4OH$ or epoxyalkyl acrylic esters of structure $CH_2=CR^2CO_2R^5$, where, in all cases, $R^2$ is H or $CH_3$, $R^3$ in the amides is hydroxyalkyl of one to about four carbons, $R^4$ in the esters is hydroxyalkyl of two to about four carbons and $R^5$ is an epoxyalkyl group of three or four carbons. Some of these monomers are commercially available, e.g. N-methylol acrylamide, N-methylol methacrylamide, 2-hydroxyethyl acrylate, 2-hydroxyethyl methacrylate, glycidyl acrylate and glycidyl methacrylate. The other hydroxyalkylamides are readily available by reaction of acryloyl or methacryloyl chloride with hydroxyalkylamines such as ethanolamine, 2-hydroxypropylamine, 3-hydroxypropylamine, 2-hydroxybutylamine, 3-hydroxybutylamine or 4-hydroxybutylamine. Other hydroxyalkyl acrylates or methacrylates are available by esterification of one mole of acrylic or methacrylic acid with one mole of diols such as 1,2-propylene diol, 1,3-propylene diol, 1,2-butylene diol, 1,3-butylenediol or 1,4-butylene diol. Other epoxyalkyl esters are available from the epoxy butanols.

Of these monomers, the commercially available monomers are preferred, i.e. N-methylol acrylamide or methacrylamide, 2-hydroxyethyl acrylate or methacrylate or glycidyl acrylate or methacrylate.

Mixtures of two or more of these monomers may be used and, in some cases, such mixtures are preferred, for example equal weights of N-methylol acrylamide and 2-hydroxyethyl methacrylate.

It is necessary to use 0.1% by weight of such monomers to obtain any noticeable effect. There is no benefit in using more than 5% and larger amounts have undesirable effects on the polymer properties. About 0.5% of such monomers is preferred.

As noted earlier, these monomers $$CH_2=CR^2CONHR^3OH \text{ and } CH_2=CR^2CO_2R^4OH$$

are optional in the polymers of this invention. Perfectly satisfactory durability exists to laundering when they are completely absent although a better, more durable product may be available when they are present.

No significant amounts of monomers other than the aforementioned types should be present in the polymers of this invention, as indicated earlier, or the desirable properties will be lost.

Although the polymers of this invention may be prepared by solution polymerization techniques well known in the art, it is preferred to use aqueous emulsion techniques. In the broadest sense, any known free radical initiator may be used, including both water soluble and water insoluble types. Among the water soluble types are inorganic peroxides such as sodium peroxide, barium peroxide or ammonium or potassium persulfate and water soluble azo compounds such as azobis(isobutyramidine) dihydrochloride. Among the water insoluble types are peroxy anhydrides such as benzoyl peroxide, peroxy esters such as tert-butyl peroxy pivalate, tert-butyl peroxy benzoate, hydroperoxides such as tert-butyl hydroperoxide, ditertiary alkyl peroxides such as ditert-butyl peroxide, or water insoluble azo compounds such as azobis (isobutyronitrile), azobis(dimethylvaleronitrile) and the like. Redox initiators such as the combination of ammonium persulfate, sodium bisulfite and ferrous sulfate are also useful.

In general, the water soluble initiator azobis(isobutyramidine)dihydrochloride is the initiator of choice.

The polymerization temperature is, quite naturally, chosen to suit the initiator being used. Those skilled in the art are well aware of the temperatures appropriate to each of the aforementioned initiator types.

The polymerization is carried out by first emulsifying the monomers in water, then bringing the reaction mass to the desired temperature and adding the initiator. It may be desirable, albeit not essential, to homogenize the monomer-water mixture before heating. As many of the monomers $ROCH=CH_2$ and $R'OCF=CF_2$ as earlier defined are relatively low boiling compounds, often lower boiling than the desired polymerization temperature, provision should be made to retain these monomers in the reaction system. This is readily accomplished by use of either an efficient reflux condenser on the reaction vessel or by using a sealed autoclave for the polymerization.

Emulsifying agents must, of course, be used to obtain aqueous emulsions. Either cationic or anionic types are more preferred than the nonionic types. Mixtures of nonionics with either other type may be used. Useful cationic types are the well-known quaternary ammonium salts of long chain fatty amines, $$[R^7NR_3^6]^+X^-$$

where $R^7$ is an alkyl group of at least twelve carbons. In general, $R^6$ is a lower alkyl group such as methyl and $X^-$ is an inert anion such as chloride ion. A typical group of such agents are the ammonium salts sold by the Armour Co. under the trade name "Arquad." These are n-alkyl trimethyl ammonium chlorides where the alkyl has from 12 to 18, preferably 16, carbons. These are the preferred cationic dispersing agents. Another type of cationic agents is the acetate salts of n-alkyl dimethylamines where alkyl again contains 12 to 18 carbons. These salts are perfectly suitable insofar as the polymerizations are concerned but have a slight deleterious effect on oily-soil washability of the product polymers on fabric, hence are not preferred.

Useful anionic emulsifying agents include both the alkali metal salts of alkanesulfonic acids and alkali metal salts of monoalkylsulfuric acid esters, where alkyl again is from 12 to 18 carbons. Fatty acid soaps may be used, provided the fatty acid is relatively free of unsaturated acids.

It is generally preferable, if the most advantageous polymer properties are to be obtained, that the inherent viscosities of the polymers of this invention be below 0.8, when measured at 30° C. as 0.5% solutions in trichlorotrifluoroethane. Inherent viscosity is determined by the formula $$Vi = \frac{1}{C}\ln\left[\frac{V}{Vo}\right]$$

where $Vi$ is the inherent viscosity, C is the polymer concentration in grams per 100 ml. of solution, V is the viscosity of the solution, $Vo$ is the viscosity of the solvent and ln is the natural logarithm.

In general, very little has to be done to keep inherent viscosity below 0.8 due to the nature of the reacting monomers, vinylethers being rather more efficient chain transfer monomers than acrylic esters. If necessary, small amounts of chain transfer agents such as dodecyl mercaptan may be added to control molecular weight, hence inherent viscosity.

For use in oil and water repellent formulation, the polymer emulsions obtained by the above procedures are usually used directly in the pad bath without isolation of the polymer.

The compositions are applied preferably as an aqueous dispersion by brushing, dipping, spraying, padding, rollcoating or by any combination of these methods. For example, the prepared concentrated dispersion of polymer composition may be used as a pad bath by diluting it with water to a solids content of 0.1% to 10% by weight of the bath. The textile material is padded in this bath, and is then freed of excess liquid, usually by squeeze rolls, so that the dry pickup (weight of dry polymer on fiber) is between 0.1% and 10% by weight of the fiber. The treated material is then dried by heating, say in an oven at 135° to 172° C. until dry. The dry fabric is oil and water repellent without further heating but such further heating may increase the degree of repellency somewhat. The textile material will retain repellency even after many launderings or dry-cleanings.

It is common practice to treat fabrics with several agents at the same time. These agents may include softeners, crease resistance agents, wetting agents, antistatic agents, resin finishes, soil release agents, flame retardants and the like. When used in the presence of such agents, lower concentrations of the polymers of this invention may be required to obtain equivalent repellency than when used alone. It is also common practice to add auxiliary water repellents to treating baths. In general, far more of the polymers of this invention are required to obtain maximum water repellency than maximum oil repellency. Commercially, it is cheaper to add only as much polymer as is required to obtain the desired oil repellency, than to add the far cheaper water repellents to bring up water repellency to the desired level.

More recently, another development has occurred in the textile trade, the permanent press treatment, as taught, for example, in U.S. Pat. 2,974,432. In this treatment, a permanent press resin such as

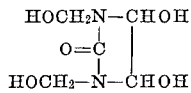

described in U.S. Pat. 3,049,446 is coapplied along with the polymers of this invention. In some cases such resins are not cured, however, until the textile is fabricated into the finished article. It is important, therefore, that the textile is repellent, without anything more than drying, which occurs when using the polymers of this invention, as above indicated.

Suitable substrates for application of the polymers of this invention are fibers, yarns, fabrics and articles made of filaments, fibers or yarns derived from natural, modified natural or synthetic polymeric materials or from blends of these. Examples are cotton, silk, regenerated cellulose, nylon and like synthetic polyamides, fiber-forming linear polyesters, fiber-forming polyacrylonitrile and modified acrylonitrile polymers, cellulose nitrate, cellulose acetate, fiberglass, paper, leather and the like. These may be in many forms of knit and woven fabrics, including sateen, poplin, broadcloth, jean cloth gabardine, upholstery materials, as well as non-woven fabrics and the like used to fabricate rainwear, work clothing, suiting, female clothing, tenting, autobody tops, furniture upholstery, draperies and a variety of others.

The polymers of this invention overcome essentially all of the objections to earlier fluorinated oil and water repellents.

EXAMPLE I

Preparation of copolymers of this invention (a) A dispersion of 144 parts $$F(CF_2)_6CH_2CH_2O_2CCH=CH_2$$

16 parts of a 50% aqueous solution of octadecyltrimethyl ammonium chloride and 80 parts water was prepared, then diluted with 48 parts further water. The dispersion was purged with nitrogen for 30 min., then 0.095 part 2-hydroxyethyl methacrylate and 0.145 part 60% aqueous N-methylolacrylamide were added and purged for an additional 30 min. Then 16 parts trifluoroethyl vinyl ether were added and the resulting mixture was added to 300 parts further water. While maintaining the mass under a slight positive nitrogen pressure and under an efficient reflux condenser, the temperature of the mass was raised to 65° C. and 0.32 part azobis(isobutyramidine)dihydrochloride was added. Further like additions of azo compound were made after 20 and 60 minutes, after which the mass was maintained at 65–70° C. for eight hours.

The resulting polymer latex contained 25.52 parts polymer per 100 parts latex, corresponding to a 96.4% monomer conversion. A sample of dried polymer had an inherent viscosity of 0.70 as a 0.5% solution in trichlorotrifluoroethane at 30° C. Nuclear magnetic resonance spectrographic analysis of a hexafluorobenzene solution of the polymer indicated it contained 2.75% by weight trifluoroethyl vinyl ether.

The composition of the polymer comprised units of the monomers shown as follows in the weight percents shown:

| | Percent |
|---|---|
| $F(CF_2)_6CH_2CH_2O_2CCH=CH_2$ | 96.5 |
| $CF_3CH_2OCH=CH_2$ | 2.75 |
| $CH_2=CHCONHCH_2OH$ | 0.25 |
| $CH_2=C(CH_3)CO_2CH_2CH_2OH$ | 0.25 |

(b) The polymerization procedure of part (a) was repeated except that the fluorinated acrylate of part (a) was replaced with $F(CF_2)_8CH_2CH_2O_2CCH=CH_2$ and the 2-hydroxyethyl methacrylate and aqueous N-methylolacrylamide were omitted. The resulting polymer contained about 96% by weight of units derived from the fluorinated acrylate and about 4% by weight of units derived from the $CF_3CH_2OCH=CH_2$. The inherent viscosity was 0.68.

(c) The polymerization procedure of part (a) was repeated except that the fluorinated acrylate of part (a) was replaced with $F(CF_2)_nCH_2CH_2O_2CCH=CH_2$ (wherein $n$ represents the numerals 6, 8, 10, 12 and 14 in the approximate weight ratio 35/30/18/8/3). The resulting polymer contained about 95–6% by weight of units derived from the fluorinated acrylate, about 4–5% by weight of units derived from the

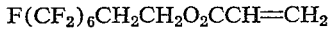

and 0.25% each of the hydroxyethyl methacrylate and methylolacrylamide. The inherent viscosity was 0.15–0.30.

(d) The polymerization procedure of part (a) was repeated except that the fluorinated acrylate of part (a) was replaced with $F(CF_2)_nCH_2CH_2O_2CCH=CH_2$ [wherein $n$ is defined in part (c)] in an amount of about 150.4 parts; and the amount of the trifluoroethyl vinyl ether employed was 9.6 parts. The resulting polymer contained about 97.5% by weight of units derived from the fluorinated acrylate, about 2% by weight of units derived from the $CF_3CH_2$—$O$—$CH=CH_2$, and about 0.25% each of the hydroxyethyl methacrylate and methylolacrylamide.

(e) The polymerization procedure of part (a) was repeated except that the fluorinated acrylate of part (a) was replaced with $F(CF_2)_nCH_2CH_2O_2CH=CH_2$ [wherein $n$ is defined as in part (c)] in an amount of about 131.2 parts; and the amount of the trifluoroethyl vinyl ether employed was 28.8 parts. The resulting polymer contained about 92% by weight of units derived from the fluorinated acrylate, about 8% by weight of units derived from $CF_3CH_2$—$O$—$CH=CH_2$, and about 0.25% each of the hydroxyethyl methacrylate and methylolacrylamide.

(f) The polymerization procedure of part (a) was repeated except that the fluorinated acrylate of part (a) was replaced with $F(CF_2)_nCH_2CH_2O_2CCH=CH_2$ [wherein $n$ is defined as in part (c)]; and the 2-hydroxyethyl methacrylate and aqueous N-methylolacrylamide were omitted. The resulting polymer contained about 96% by weight of units derived from the fluorinated acrylate and about 4% by weight of units derived from

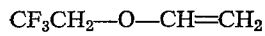

The polymer had an inherent viscosity of 0.22.

EXAMPLE II

Employing the parts and procedure of Example I(a), except as indicated, the following polymers were prepared. These polymers are not ones which fall within the scope of this invention and were prepared in order to carry out the comparison tests found in the subsequent examples:

(a) A copolymer of about 94–5% by weight of units derived from $F(CF_2)_7CH_2O_2CCH=CH_2$, about 5–6% by weight of units of $CF_3CH_2O—CH=CH_2$, and about 0.25% each by weight of units derived from 2-hydroxyethyl methacrylate and N-methylolacrylamide, having an inherent viscosity of 0.80 was prepared by polymerizing the above monomers as described in Example I(a).

(b) 156.8 parts of $F(CF_2)_nCH_2CH_2O_2CCH=CH_2$ [wherein $n$ is defined as in part (c) of Example I], 3.2 parts of $CF_3CH_2OCH=CH_2$, and the same amounts of 2-hydroxyethyl methacrylate and N-methylolacrylamide as shown in Example I(a) were polymerized as described in Example I(a). The resulting polymer contained only about 1% by weight of units derived from $$CF_3CH_2OCH=CH_2$$

(c) A copolymer of $F(CF_2)_nCH_2CH_2O_2CCH=CH_2$ [wherein $n$ is defined as in Example I(c)] in about 99.5% by weight units and about 0.25% by weight each of units derived from 2-hydroxyethyl methacrylate and N-methylolacrylamide was prepared by reacting the monomers as described in Example I(a). However, the trifluoroethyl vinyl ether was omitted. The resulting copolymer had an inherent viscosity of 0.47.

EXAMPLE III

The water repellency of the polymer of Example I(c) was compared with that of the polymer of Example II(c) by preparing pad baths with formulations containing each. Each formulation was padded onto a 65/35 polyethylene terephthalate/cotton-"Thermosol"-dyed poplin fabric until a desired percent wet pick-up on weight of fabric (OWF) of the polymer and other dispersants of the formulation was obtained on the fabric. The desired amount of pick-up is obtained by adjustment of the squeeze rolls. The treated fabrics were then air-dried and cured at about 350° F. for 10 minutes. They were then tested for their initial oil and water repellency and were retested after subjecting them to various home wash-tumble dry or air-dry or dry-cleaning procedures as described below.

The formulations employed and the percent on weight fabric pick-up are shown in the following table. Four formulations were used labeled A, B, C, and D, i.e., Formulations A and B contained the polymer of Example I(c) and were identical except that the amount of the polymer in Formulation A was sufficient to produce a 2% OWF pick-up on the fabric, while the amount of the polymer in Formulation B was sufficient to produce a 3% OWF pick-up on the fabric. Formulations C and D contained the polymer of Example II(c) and were identical except for the amounts of polymer in each.

| Component of formulation | Amount of formulation component on fabric (percent OWF) | | | |
|---|---|---|---|---|
| | A | B | C | D |
| A 6.54% active ingredient dispersion of the polymer of Example I(c) | 2 | 3 | | |
| A 6.21% active ingredient dispersion of the polymer of Example II(c) | | | 2 | 3 |
| A 40% active ingredient crease-proof resin ("Permafresh 183"), a dispersion of a compound determined as being HOCH—N—CHOH <br>        \|<br>    O=C<br>       \|<br>HOCH₂—N—CHOH | 12 | 12 | 12 | 12 |
| A catalyst comprising a 27% aqueous zinc nitrate solution | 2.3 | 2.3 | 2.3 | 2.3 |
| A stabilizer comprising a 30% aqueous solution of ·HCl $x+y=15$ | 0.04 | 0.04 | 0.04 | 0.04 |

Table I below shows the oil and water repellencies of the fabrics treated with Formulations A, B, C and D initially, after one home wash-air dry, after one home wash-tuble dry, after five home wash-tumble dry cycles, after one dry cleaning, and after five dry cleanings.

The oil repellencies were determined using Test Method No. 118–1966T of the American Association of Textile Chemists and Colorists, modified in that the oils used contained dissolved therein a blue oil-soluble dye and the determinations were made after three minutes, rather than the 30 sec. required by the aforementioned test. Oil-repellency figures run from 1–6; 6 being good repellency, 1 being poor. Water repellencies were determined by Test Method No. 22–1952 of the aforementioned association. Water-repellency figures run from 0 to 100; 100 being good repellency, 0 being poor.

Home laundering tests were carried out in a Kenmore washer Model 600 loaded with a 4-lb. load, with 29 g. of Tide. The wash is set at hot (12 min. cycle) and a warm rinse (12 min.). The total washing and rinsing time is 40 minutes. In the home laundering air-dry test, the spun-dry fabrics are dried at ambient temperatures. In the home laundering tumble-dry test, the spun-dry fabrics are dried at 156°–160° F. in a home drier with tumbling.

The dry-cleaning test consists of agitating the sample for 120 minutes in tetrachloroethylene containing 1.5% (weight/volume) of a commercial dry-cleaning detergent (R. R. Street Co., 886 Detergent), extraction with tetrachloroethylene, drying for three minutes at 66° C. in a drum and followed by a 15-second pressing at 149° C. on each side of the fabric.

The oil and water repellencies of the fabrics before and after the above-described tests are shown in the following Table I:

TABLE I

| Formulation | Formulation | | | |
|---|---|---|---|---|
| | A | B | C | D |
| Initial repellency: | | | | |
| Oil | ¹ 5 | ² 6 | ³ 5 | ⁴ 6 |
| Water | ¹ 80 | ² 80 | ³ 70 | ⁴ 70 |
| Repellency after: | | | | |
| 1 HWAD ⁵: | | | | |
| Oil | 2 | 2 | 2 | 2 |
| Water | 50 | 70 | 50 | 50 |
| 1 HWTD ⁶: | | | | |
| Oil | 4 | 5 | 3 | 4 |
| Water | 70 | 70 | 50 | 70 |
| 5 HWTD ⁶: | | | | |
| Oil | 2 | 4 | 1 | 2 |
| Water | 50 | 50 | 50 | 50 |
| 1 DC ⁷: | | | | |
| Oil | 5 | 6 | 4 | 6 |
| Water | 50 | 70 | 50 | 70 |
| 5 DC ⁷: | | | | |
| Oil | 4 | 5 | 3 | 5 |
| Water | 50 | 50 | 50 | 50 |

¹ Example Ic polymer, 2% OWF.
² Example Ic polymer, 3% OWF.
³ Example IIc polymer, 2% OWF.
⁴ Example IIc polymer, 3% OWF.
⁵ Home wash air dry.
⁶ Home wash tumble dry.
⁷ Dry-cleaning.

These formulations contained no added water repellent, as is usually the case in most oil/water-repellent formulations for commercial textile treatment. Hence water repellency is not as good as would be expected in a full commercial formulation.

EXAMPLE IV

Aqueous emulsions of the polymers obtained in Examples I(c), I(d), I(e) and II(b) were prepared in which the emulsion contained 5.4% by weight of $F(CF_2)_nCH_2CH_2O_2CCH=CH_2$ in polymerized form.

Formulations containing the emulsions (or dispersions) obtained in the preceding paragraph were prepared as described in Example III using the same ingredients (other than the polymers). However, the formulations were made up such that the percent pick-up on weight of fabric of the polymers was 1, 2 and 4%, while the percent pick-up OWF for the other components of the formulation was in each, 12% OWF for the crease-proof resin, 2.4% OWF for the catalyst, and 0.05% OWF for the stabilizer.

The formulations prepared above were tested for their oil repellency before and after laundering and cleaning tests carried out acocrding to the description in Example III. The results of such tests are shown in Table II.

EXAMPLE V

An emulsion (labeled the First Emulsion in Table III below) was prepared containing 6.48% active ingredient of the polymer of Example I(c) and containing 7.8% active ingredient of a copolymer of 2-ethylhexyl methacrylate and N-methylolacrylamide (in which the amount of N-methylolacrylamide in the copolymer was about 0.5% by weight).

A similar emulsion (labeled the Second Emulsion in Table III below) was prepared which contained only 6.48% active ingredient of the polymer of Example I(c).

Three different formulations were prepared from each of the two emulsions (resulting in 6 formulations in all). One of each set of three was prepared to result in a percent pick-up on weight of fabric of the polymer or polymers in the formulation of 2%. Another of each set of three was prepared to result in a percent pick-up on weight of fabric of the polymer or polymers in the formulation of 3%. The last of each set of three was prepared to result in a percent pick-up on weight of fabric of the polymer or polymers in the formulation of 4%. Each of the six formulations contained a water repellent (a 25% solids dispersion in water in which the solids were 47.5% tris(methoxy methyl) tris(behenoyloxymethyl) melamine, 47.5% paraffin wax, and 5% dimethyl fatty amine acetates) in an amount sufficient to result in an on-weight fabric pickup of about 2%; a wash/wear resin of triazine-formaldehyde condensate ("Aerotex" 23 Special) in an amount sufficient to result in an on-weight fabric pick-up of about 5%; and the catalyst and stabilizer used in the formulations described in Example III in amounts sufficient to result in an on-weight fabric pick-up of about 1% and 0.04%, respectively.

Each of the six formulations was applied to the fabric used in Example III and the fabrics then dried at 340° F., then cured for two minutes at the same temperature.

The fabrics were tested for the initial oil and water repellency, for their repellency after 1 dry-cleaning, and for their repellency after 1 standard laundering (which consisted of agitating the treated fabric for 40 min. at 60° C. to 100° C. in water containing 0.1% by weight neutral chip soap+0.05% soda ash, rinsing with 60° C. water three times, spin drying, then pressing on each face at 300° F.±20° F. for 30 sec.)

The results are shown in Table III.

EXAMPLE VI

Three formulations were prepared. Each contained sufficient sodium acetate to provide a 4% pick-up on weight of fabric of the acetate, sufficient acetic acid to provide a 0.3% pick-up on weight of fabric of the acid, and sufficient long chain alkyl pyridinium chloride water repellent to provide a 4% pick-up on weight of fabric of the chloride. In addition, one formulation contained sufficient 6.5% active ingredient emulsion of the polymer of Example I(c) to provide a 2% pick-up on weight of fabric of the polymer. The second formulation contained a sufficient amount of said polymeric emulsion to provide a 4% pick-up. The last formulation contained a sufficient

TABLE II

| Formulation containing polymer of example | Formulations resulting in fabrics containing 1% OWF polymer | | | | Formulations resulting in fabrics containing 2% OWF of polymer | | | | Formulations resulting in fabrics containing 4% OWF of polymer | | | |
|---|---|---|---|---|---|---|---|---|---|---|---|---|
| | Initial oil repellency | Oil repellency after— | | | Initial oil repellency | Oil repellency after— | | | Initial oil repellency | Oil repellency after— | | |
| | | 1 HWAD | 1 HWTD | 1 DC | | 1 HWAD | 1 HWTD | 1 DC | | 1 WHAD | 1 HWTD | 2 DC |
| I(c) 95-6% F(CF$_2$)$_n$CH$_2$CH$_2$O$_2$—CCH=CH$_2$; 4-5% CF$_3$CH$_2$OCH=CH$_2$ | 2 | 1 | 2 | 2 | 5 | 2 | 3 | 4 | 6 | 3 | 5 | 5 |
| I(d) 98% F(CF$_2$)$_n$CH$_2$CH$_2$O$_2$—CCH=CH$_2$; 2% CF$_3$CH$_2$OCH=CH$_2$ | 2 | 1 | 1 | 1 | 5 | 2 | 3 | 4 | 5 | 4 | 5 | 5 |
| I(e) 92% F(CF$_2$)$_n$CH$_2$CH$_2$O$_2$—CCH=CH$_2$; 8% CF$_3$CH$_2$OCH=CH$_2$ | 3 | 2 | 2 | 2 | 5 | 2 | 4 | 5 | 5 | 2 | 4 | 5 |
| II(b) 99% F(CF$_2$)$_n$CH$_2$O$_2$CCH=CH$_2$; 1% CF$_3$CH$_2$OCH=CH$_2$ | 1 | 0 | 0 | 0 | 3 | 1 | 2 | 2 | 5 | 2 | 4 | 6 |

TABLE III

| Formulation containing— | Oil repellency | | | Water repellency | | |
|---|---|---|---|---|---|---|
| | Initial oil repellency | Oil repellency after | | Initial water repellency | Water repellency after | |
| | | 3 SW | 1 DC | | 3 SW | 1 DC |
| First emulsion in 2% OWF formulation | 4 | 4 | 5 | 80 | 80 | 80 |
| First emulsion in 3% OWF formulation | 5 | 6 | 6 | 90 | 80 | 80 |
| First emulsion in 4% OWF formulation | 5 | 6 | 6 | 80 | 80 | 80 |
| Second emulsion in 2% OWF formulation | 3 | 3 | 3 | 80 | 80 | 80 |
| Second emulsion in 3% OWF formulation | 4 | 4 | 5 | 80 | 80 | 80 |
| Second emulsion in 4% OWF formulation | 5 | 5 | 5 | 90 | 80 | 80 | amount of said polymeric emulsion to provide a 5% pick-up.

Each formulation was applied to 9 oz. sateen, dried and cured as described in Example V. The treated fabrics were tested for their initial oil and water repellency, their repellency after 15 launderings, and their dynamic absorption. The results are shown in Table IV following:

TABLE IV

| | Formulation providing 2% OWF pick-up of the polymer | Formulation providing 4% OWF pick-up of the polymer | Formulation providing 5% OWF pick-up of the polymer |
|---|---|---|---|
| Initial repellency: | | | |
| Oil | 6 | 7 | 7 |
| Water | 100 | 100 | 100 |
| After 15 launderings [1]: | | | |
| Oil | 4 | 5 | 6 |
| Water | 70 | 80 | 80 |
| Dynamic absorption [2]: | | | |
| Initial | 23 | 22.6 | 21.7 |
| After 15 ml | 27.3 | 24.4 | 22.3 |

[1] Federal Specifications, Textile Test Methods CCC-T191B—Method 556.3—cotton procedure.
[2] Federal Specifications, Textile Test Methods CCC-T191B—Method 5500.1. American Association of Textile Chemists & Colorists, Method 70B-1967.

EXAMPLE VII

A pad bath was prepared and applied to 8.4 oz./yd.$^2$ of 100% nylon 66 tricot (commonly used on automobile upholstery) giving 0.22% loading of the fluoropolymer of Example I(c) on weight of fabric. After drying and curing as described in Example V, the fabric had an oil repellency of 6 and a water repellency of 90. After 5,000 cycles in a Wyco abrader, the oil and water repellency were 5 and 50, respectively.

EXAMPLE VIII

An emulsion was prepared of the polymer of Example I(c) as described for the preparation of the formulation labeled A in Example III. A cotton/polyester (35/65) poplin fabric was treated with the emulsion, cured for 10 min. at 340° F., given one dry-cleaning, then abraded in a Wyco abrader. Samples were evaluated for oil repellency at various points. The results are shown in Table V.

TABLE V

| No. cycles abrasion: | Oil repellency |
|---|---|
| 0 | 6 |
| 500 | 6 |
| 1000 | 6 |
| 1500 | 6 |
| 5000 | 4 |

EXAMPLE IX

Pad baths were prepared with the formulations shown below. Textiles were padded with these baths and the wet pick-up was controlled to give the concentrations on fabric shown by adjustment of the squeeze rolls. The treated fabrics were then placed in an oven heated at 275° F. for specific times and the indicated repellencies were determined. Fabrics in the oven 40 sec. or less were still wet. In all cases, the fabrics were air dried in a constant humidity room until constant weight is reached before the repellency was determined. The results are shown in Table VI.

FORMULATIONS

| | Percent OWF | | | | |
|---|---|---|---|---|---|
| Component | A | B | C | D | E |
| Fluoropolymer dispersion A [1] | 2 | | | | |
| Fluoropolymer dispersion B [2] | | 2.5 | 3.5 | | |
| Fluoropolymer dispersion C [3] | | | | 2.5 | 3.5 |
| "Permafresh" 183 | 12 | 12 | 12 | 12 | 12 |
| Catalyst [4] | 2.3 | 2.3 | 2.3 | 2.3 | 2.3 |
| Stabilizers [4] | 0.04 | 0.04 | 0.04 | 0.04 | 0.04 |

[1] Fluoropolymer dispersion A—6.54% A. I. dispersion of the polymer of example 1C.
[2] Fluoropolymer dispersion B—6.21% A. I. dispersion of the polymer of example 1C.
[3] Fluoropolymer dispersion C—6.21% A. I. dispersion of the polymer of example 2C.
[4] "Permafresh" 183, catalyst and stabilizer as identified in example III.

The fabrics treated were:
Fabric A—65/35 polyethylene terephthalate/cotton-"Thermosol" dyed poplin.
Fabric B—undyed, mercerized cotton, neutral pH, no whiteners, 1.6 yards/lb., 46 inches wide.

The results are shown below. In these tests, two oil repellency tests were used; "30 sec." refers to Test Method No. 118–1966T as written; "3 min." refers to the 3 minute variation using blue dyed oils described in Example III. Water Repellency was determined as in Example III.

TABLE VI

| Time (sec.), fabric-A | Formulation | Oil repellency | |
|---|---|---|---|
| | | "30 sec." | "3 min." |
| 10 | A | | 1 |
| 20 | A | | 1 |
| 40 | A | | 3 |
| 80 | A | | 3 |
| 160 | A | | 3 |
| 300 | A | | 3 |
| 20 | B | 4 | 4 |
| 10 | B | 4 | 4 |
| 40 | B | 5 | 4 |
| 60 | B | | 4 |
| 10 | C | 4 | 4 |
| 20 | C | 5 | 4 |
| 10 | C | 6 | 5 |
| 20 | D | 2 | 2 |
| 20 | D | 2 | 2 |
| 60 | D | 4 | 3 |
| 40 | D | | 4 |
| 40 | E | 3 | 3 |
| 40 | E | 3 | 2 |
| 10 | E | 6 | 5 |

| Time (sec.), fabric-B | Formulation | Water repellency |
|---|---|---|
| 10 | C | 50 |
| 20 | C | 70 |
| 40 | C | 70 |
| 60 | C | 70 |
| 80 | C | 70 |
| 10 | E | 0 |
| 20 | E | 0 |
| 40 | E | 50 |
| 60 | E | 50 |
| 80 | E | 70 |

On Fabric A, oil repellency develops to a much higher degree before the fabric is actually dry (time 40 sec. or less) with Formulations B and C of this invention than with Formulations D and E which are outside this invention. Likewise, on Fabric B, the water repellency develops more quickly and to a higher degree with Formulation C than Formulation E.

EXAMPLE X

A set of cotton/polyester (35/65) poplin fabrics were treated with the formulation described as Formulation B in Example III (which contains the polymer of Example I(c)), and a second set of the same fabric was treated with a formulation identical to that of Formulation B except that the polymer in Formulation B was replaced with the polymer of Example II(c) (a homopolymer of $F(CF_2)_nCH_2CH_2O_2CCH=CH_2$). This second formulation is identified as Formulation B in Table VII below.

Samples of each set of treated fabrics were then subjected to repeated home laundering with tumble dry as described in Example III with the oil repellencies being determined periodically. A second set of samples of each set of fabrics was subjected to the dry-cleaning treatment described in Example III with oil repellencies again being determined periodically. The results are shown in Table VII.

TABLE VII

| Number of HWTD[1] cycles | Oil repellency | | Number of DC[2] cycles | Oil repellency | |
|---|---|---|---|---|---|
| | Formulation B | Formulation B' | | Formulation B | Formulation B' |
| 0 | 6 | 6 | 0 | 6 | 6 |
| 1 | 5 | 4 | 1 | 6 | 6 |
| 3 | 4 | 3 | 3 | 5 | 6 |
| 5 | 4 | 3 | 5 | 5 | 5 |
| 10 | 2 | 2 | 10 | 4 | 4 |
| 15 | 2 | 1 | | | |
| 20 | 2 | 1 | | | |

[1] Home wash-tumble dry.
[2] Dry-cleanings.

Note that Formulation B, where the fluorinated polymer contains the durabilizers hydroxyethyl methacrylate and methylolacrylamide is about one oil unit more durable to laundering than Formulation B' where the durabilizers are absent. Even when the durabilizers are absent, reasonable results are obtained. On the other hand, these two added monomers have no beneficial effect on durability to dry-cleaning.

Note that Formulation B is about one oil unit more durable to laundering than Formulation B'.

EXAMPLE XI

A cotton/polyester (35/65) poplin fabric was treated with Formulation A of Example III and cured as described therein. The fabric was then subjected to the dry-cleaning procedure of Example III, omitting the pressing step. Instead, after removal of the excess solvent, the fabric was placed in a flat bed press for a specified number of seconds on each side of fabric and then the oil repellency was determined. The results are shown in Table VIII.

TABLE VIII

| Seconds in press: | Oil repellency |
|---|---|
| Initial [1] | 5 |
| 0 | 4 |
| 5 | 4 |
| 10 | 4 |
| 15 | 4 |

[1] Before dry-cleaning.

Note that oil repellency recovers with essentially no pressing after dry-cleaning.

EXAMPLE XII

Oily soil washability

Circular swatches of fabric identical to the fabric used in Example III were treated with the formulations described as follows. Each formulation was identical to that described for the formulations shown in Example III except the polymers used in the formulations of Example III were replaced by the polymers set forth following in the amounts sufficient to provide the on-weight-of-fabric pick-up of polymer set forth following:

The polymer of Example I(a) was used in one formulation in an amount sufficient to provide an OWF pick-up of 1%. The same polymer was used in three other formulations in amounts sufficient to provide OWF pick-ups of 2, 3 and 4%, respectively. The polymer of Example I(b) was used in four other formulations in amounts sufficient to provide OWF pick-ups of polymer of 1, 2, 3 and 4%. The polymer of Example II(a) was used in four other formulations in amounts sufficient to provide OWF pick-ups of polymer of 1, 2, 3 and 4%.

Each treated fabric was soiled by vacuum sucking dyed (blue, oil-soluble dye) "Nujol" through the cloth. Each fabric was then washed by placing it in an 8 oz. jar with 150 ml. detergent solution (1.5 g./l.) and shaken in a horizontal position in a thermostat bath, at about 50–55° C. The samples were then rinsed free of detergent and dried to constant weight. From the weights of fabric sample before soiling and after soiling, the percent oil pick-up and percent oil retention, on weight of fabric, were calculated.

A second set of fabrics treated with the formulations described above was first subjected to one home laundering-tumble dry as described in Example III then subjected to the soiling procedure described above. The percent oil retention of each fabric is shown in Table IX following.

TABLE IX

| Formulation resulting in OWF pick-up of— | Fabric containing polymer of Example Ia, percent oil retention | | Fabric containing polymer of Example Ib, percent oil retention | | Fabrics containing polymer of Example IIa, percent oil retention | |
|---|---|---|---|---|---|---|
| | Measured without laundering prior to testing | Measured after laundering | Measured without laundering prior to testing | Measured after laundering | Measured without laundering prior to testing | Measured after laundering |
| 1 | 14.4 | 7.3 | 8.2 | 6.2 | 21.2 | 13.8 |
| 2 | 14.1 | 15.6 | 7.5 | 10.3 | 26.4 | 27.1 |
| 3 | 6.9 | 38.8 | 5.9 | 20.6 | 20.7 | 35.3 |
| 4 | 6.1 | 38.4 | 6.7 | 24.7 | 14.3 | 38.8 |

These results show that the polymers of this invention (I(a) and I(b)) have inherently lower oil retention than does a polymer not of this invention (II(a)).

EXAMPLE XIII

Example XII was repeated using two wash temperatures and two detergent concentrations in the test laundering procedure and using the same emulsions as described therein except the amounts of polymer present were sufficient to produce the pick-up on weight of fabric (OWF) shown in Table X below. The fabrics were evaluated only after one home laundering with tumble dry. The results are described in Table X following.

TABLE X

| Fabric treated with the formulation containing the polymer of example | Percent emulsion, OWF | Wash temp., °C. | Detergent conc., g./l. | Percent oil retention after one HWTD |
|---|---|---|---|---|
| Ia | 2 | 50 | 0.42 | 35 |
| | 3 | 50 | 0.42 | 30 |
| | 2 | 75 | 0.42 | 28 |
| | 3 | 75 | 0.42 | 24 |
| | 2 | 50 | 1.5 | 22 |
| | 3 | 50 | 1.5 | 12 |
| | 2 | 75 | 1.5 | 10 |
| | 3 | 75 | 1.5 | 7 |
| Ib | 2 | 50 | 0.42 | 30 |
| | 3 | 50 | 0.42 | 25 |
| | 2 | 75 | 0.42 | 23 |
| | 3 | 75 | 0.42 | 12 |
| | 2 | 50 | 1.5 | 11 |
| | 3 | 50 | 1.5 | 8 |
| | 2 | 75 | 1.5 | 7 |
| | 3 | 75 | 1.5 | 7 |
| IIa | 2 | 50 | 0.42 | 39 |
| | 3 | 50 | 0.42 | 34 |
| | 2 | 75 | 0.42 | 37 |
| | 3 | 75 | 0.42 | 30 |
| | 2 | 50 | 1.5 | 27 |
| | 3 | 50 | 1.5 | 25 |
| | 2 | 75 | 1.5 | 26 |
| | 3 | 75 | 1.5 | 14 |

It is readily apparent that under any set of conditions, the polymers of this invention (those of Examples I(a) and I(b)) have superior oily soil washability than does a polymer not of this invention (II(a)).

EXAMPLE XIV

Using the polymerization procedure set forth in Example I, polymers were prepared using the monomer concentrations set forth in parts A–J. ($n$ in each part is defined as in Example I(c)).

(A)(a) 132.8 parts $F(CF_2)_nCH_2CH_2O_2CCH=CH_2$, (b) 27.2 parts $CF_3CH_2OCH=CH_2$, (c) 0.475 part 2-hydroxyethyl methacrylate and (d) 0.725 part 60% aqueous N-methylolacrylamide. The resulting polymer contained 1.25% each of components (c) and (d), by weight.

(B)(a) 132.8 parts $F(CF_2)_nCH_2CH_2O_2CCH=CH_2$, (b) 27.2 parts $CF_3CH_2OCH=CH_2$, (c) 0.950 part 2-hydroxyethyl methacrylate, and (d) 1.45 parts 60% N-methylolacrylamide. The resulting polymer contained 2.5% each of components (c) and (d), by weight.

(C)(a) 132.8 parts $F(CF_2)_nCH_2CH_2O_2CCH=CH_2$, (b) 27.2 parts $CF_3CH_2OCH=CH_2$, (c) 0.095 part 2-hydroxyethyl methacrylate, and (d) 0.725 part 60% aqueous N-methylolacrylamide. The resulting polymer contained 92.3% (a), 6.2% (b), 0.25% (c) and 1.25% (d), by weight.

(D)(a) 144 parts $F(CF_2)_nCH_2CH_2O_2CCH=CH_2$, (b) 16 parts $CF_3CH_2OCH=CH_2$, (c) 0.475 part 2-hydroxyethyl methacrylate, and (d) 0.725 part 60% N-methylolacrylamide. The resulting polymer contained 1.25% (d), by weight.

(E)(a) 144 parts $F(CF_2)_nCH_2CH_2O_2CCH=CH_2$, (b) 16 parts $CF_3OCF=CF_2$, (c) 0.095 part 2-hydroxyethyl methacrylate, and (d) 0.145 part 60% aqueous N-methylolacrylamide. The resulting polymer contained 0.25% each of (c) and (d) by weight.

(F)(a) 130.9 parts $F(CF_2)_nCH_2CH_2O_2CCH=CH_2$, (b) 29.1 parts $CF_3OCF=CF_2$, (c) 0.095 part 2-hydroxyethyl methacrylate, and (d) 0.145 part 60% N-methylolacrylamide. The resulting polymer contained 92.9% (a), 6.6% (b), 0.25% (c) and 0.25% (d), by weight.

(G)(a) 120 parts $F(CF_2)_nCH_2CH_2O_2CCH=CH_2$, (b) 40 parts $CF_3OCF=CF_2$, (c) 0.095 part 2-hydroxyethyl methacrylate, and (d) 0.145 part 60% N-methylolacrylamide. The resulting polymer contained 0.25% (c) and (d) each, by weight.

(H)(a) 144 parts $F(CF_2)_nCH_2CH_2O_2CCH=CH_2$, (b) 16 parts $CF_3(CF_2)_2OCF=CF_2$, (c) 0.095 part 2-hydroxyethyl methacrylate, and (d) 0.145 part 60% N-methylolacrylamide. The resulting polymer contained 0.25% (c) and (d) each, by weight.

(I)(a) 130.9 parts $F(CF_2)_nCH_2CH_2O_2CCH=CH_2$, (b) 29.1 parts $CF_3(CF_2)_2OCF=CF_2$, (c) 0.095 part 2-hydroxyethyl methacrylate, and (d) 0.145 part 60% N-methylolacrylamide. The resulting polymer contained 0.25% (c) and (d) each, by weight.

(J)(a) 120 parts $F(CF_2)_nCH_2CH_2O_2CCH=CH_2$, (b) 40 parts $CF_3(CF_2)_2OCF=CF_2$, (c) 0.095 part 2-hydroxyethyl methacrylate and (d) 0.145 part 60% N-methylolacrylamide. The resulting polymer contained 0.25% (c) and (d) each, by weight.

Each polymeric emulsion obtained in parts A–J above was diluted to an emulsion containing 6.21% active ingredient of the polymer to obtain formulations resulting in percent pick-up of each polymer of 1, 2 and 4% on weight of fabric (OWF). Each formulation also contained 12% OWF of the crease-proof resin that was used in the formulations of Example III, 2.3% OWF of the catalyst that was used in the formulations of Example III, 0.05% OWF of the stabilizer that was used in the formulations of Example III, and in addition, contained 0.4% OWF acetic acid.

Each formulation was applied to the fabric used in Example III as described therein and cured and tested for oil repellency as described therein. The results are shown below in Table XI.

TABLE XI

| Fabric treated with the formulation containing the polymer of Example— | Percent OWF formulation employed | Oil repellencies | | | |
|---|---|---|---|---|---|
| | | Initial | 1HWAD | 3HWTD | 1DC |
| XIVA | 1 | 1 | 0 | 0 | 0 |
| | 2 | 4 | 2 | 2 | 2 |
| | 4 | 6 | 5 | 5 | 5 |
| XIVB | 1 | 2 | 1 | 0 | 1 |
| | 2 | 4 | 2 | 1 | 2 |
| | 4 | 6 | 4 | 4 | 5 |
| XIVC | 1 | 1 | 0 | 0 | 0 |
| | 2 | 2 | 1 | 1 | 2 |
| | 4 | 6 | 4 | 4 | 5 |
| XIVD | 1 | 1 | 0 | 0 | 1 |
| | 2 | 3 | 2 | 1 | 2 |
| | 4 | 5 | 4 | 4 | 5 |
| XIVE | 2 | 1 | 0 | 0 | 1 |
| | 4 | 3 | 1 | 2 | 2 |
| XIVF | 2 | 1 | 0 | 0 | 1 |
| | 4 | 4 | 1 | 2 | 2 |
| XIVG | 2 | 3 | 1 | 2 | 2 |
| | 4 | 6 | 2 | 3 | 5 |
| XIVH | 2 | 1 | 0 | 0 | 1 |
| | 4 | 4 | 2 | 2 | 3 |
| XIVI | 2 | 1 | 0 | 2 | 0 |
| | 4 | 4 | 1 | 3 | 2 |
| XIVJ | 2 | 2 | 1 | 1 | 5 |
| | 4 | 5 | 2 | 3 | 6 |

EXAMPLE XV

A. Example Ia was repeated using (a) 144 parts $F(CF_2)_nCH_2CH_2O_2CCH=CH_2$ (defined as in Example I(c)), (b) 16 parts $CF_3CH_2OCF=CF_2$, (c) 0.095 part 2-hydroxyethyl methacrylate, and (d) 0.145 part 60% N-methylolacrylamide. The resulting polymer contained 0.25% (c) and 0.25% (d), by weight.

B. Example Ia was repeated using (a) 131.2 parts $F(CF_2)_nCH_2CH_2O_2CCH=CH_2$ (defined as in Example I(c)), (b) 28.8 parts $CF_3CH_2OCF=CF_2$, (c) 0.095 part 2-hydroxyethyl methacrylate, and (d) 0.145 part 60% N-methylolacrylamide. The resulting polymer contained 0.25% (c) and 0.25% (d), by weight.

The emulsions obtained in these two polymerizations were diluted to 5.4% A.I. of $$F(CF_2)_nCH_2CH_2O_2CCH=CH_2$$

incorporated into the formulation of Example XIV and applied as in Example XIV with the results shown in Table XII.

TABLE XII

| Polymer example | Conc., percent OWF | Repellencies | | | |
|---|---|---|---|---|---|
| | | Initial oil | 1HWAD oil | 1HWTD oil | 1DC oil |
| XVA | 1 | 2 | 0 | 1 | 1 |
| | 2 | 5 | 2 | 4 | 4 |
| | 4 | 6 | 3 | 5 | 5 |
| XVB | 1 | 3 | 0 | 2 | 2 |
| | 2 | 5 | 2 | 4 | 5 |
| | 4 | 6 | 3 | 5 | 5 |

EXAMPLE XVI

Using the procedure of Example XII, oil retention was determined for a number of polymers of the previous examples. All of these polymers were applied as described in Example XII. The results are shown in Table XIII.

TABLE XIII

| Polymer example | Percent OWF | Percent oil retention |
|---|---|---|
| XIVE | 2 | 5.9 |
| XIVF | 2 | 5.5 |
| XIVG | 2 | 6.5 |
| XIVH | 2 | 6.5 |
| XIVI | 2 | 5.6 |
| XIVJ | 2 | 6.9 |

EXAMPLE XVII

Bleached, unsized paper was immersed in an aqueous dispersion containing 0.25% by weight of the polymer of Example I(c) for 15 sec., passed through a nip roll (120% wet pickup) and dried for three minutes at 95° C. The resulting paper contained 0.3% by weight polymer.

The resulting paper withheld the No. 5 oil (dodecane) from oil repellency test No. 118–1966T mentioned in Example III from penetration of the paper for three minutes. A lactic acid/ink mixture failed to penetrate for about one minute.

Similarly, unbleached waterleaf kraft paper was treated to obtain 0.4% fluoropolymer on weight of paper. The No. 8 oil (heptane) failed to penetrate after three minutes and the lactic acid/ink mixture required five minutes for penetration.

The preceding representative examples may be varied within the scope of the present total specification disclosure, as understood and practiced by one skilled in the art, to achieve essentially the same results.

The foregoing detailed description has been given for clearness of understanding only and no unnecessary limitations are to be understood therefrom. The invention is not limited to the exact details shown and described, for obvious modifications will occur to those skilled in the art.

The embodiments of the invention in which an exclusive property or privilege is claimed are defined as follows:

1. An oil- and water-repellent copolymer consisting essentially of
   (a) from about 75 percent to about 98 percent by weight of units derived from monomers of the structural formula $$R_fCH_2CH_2O_2CCH=CH_2$$

wherein $R_f$ is a perfluoroalkyl group of from four to fourteen carbon atoms;
   (b) from about 25 percent to about 2 percent by weight of units derived from monomers selected from the class consisting of
      (1) $ROCH=CH_2$ wherein R is $X(CF_2)_nCH_2$ or $(CF_3)_2CH-$ where X is F or H and $n$ is one or two, or
      (2) $R'OCF=CF_2$ wherein $R'$ is $F(CF_2)_m$ or R where $m$ is from one to three; and
   (c) from 0 percent to about 5 percent by weight of units derived from monomers selected from the class consisting of
      (1) $CH_2=CR^2CONHR^3OH$,
      (2) $CH_2=CR^2CO_2R^4OH$,
      (3) $CH_2=CR^2CO_2R^5$ or
      (4) mixtures of the above wherein $R^2$ is H or $CH_3$, $R^3$ is alkylene of one to four carbon atoms, $R^4$ is alkylene of two to four carbon atoms, and $R^5$ is epoxyalkyl of three to four carbon atoms;

and wherein the total percent by weight of units present in the copolymer is 100 percent.

2. The copolymer of claim 1 wherein $R_f$ in the units defined in part (a) of claim 1 has the formula $F(CF_2)_s$ wherein $s$ is a cardinal number of four to fourteen.

3. The copolymer of claim 2 wherein $s$ in the formula $F(CF_2)_s$ has the numerical values 6, 8, 10, 12 and 14 present in a weights ratio of 35/30/18/8/3.

4. The copolymer of claim 3, said copolymer having an inherent viscosity as 0.5% solutions in trichlorotrifluoroethane at 30° C. of less than 0.8.

5. The copolymer of claim 4 wherein the units defined in part (b) are derived from $ROCH=CH_2$.

6. The copolymer of claim 5 wherein the R group of $ROCH=CH_2$ is $CF_3CH_2-$.

7. The copolymer of claim 1 wherein the units defined in part (b) are derived from $ROCH=CH_2$.

8. The copolymer of claim 7, said copolymer having an inherent viscosity as 0.5% solutions in trichlorotrifluoroethane at 30° C. of less than 0.8.

9. The copolymer of claim 8 wherein the R group in $ROCH=CH_2$ is $CF_3CH_2-$.

10. An oil- and water-repellent copolymer consisting essentially of
(a) from about 75 percent to about 98 percent by weight of units derived from monomers of the structural formula $$R_fCH_2CH_2O_2CCH=CH_2$$

wherein $R_f$ is a perfluoroalkyl group of from four to fourteen carbon atoms;
(b) from about 25 percent to about 2 percent by weight of units derived from monomers selected from the class consisting of
  (1) $ROCH=CH_2$ wherein R is $X(CF_2)_n CH_2$ or $(CF_3)_2CH-$ where X is F or H and $n$ is one or two, or
  (2) $R'OCF=CF_2$ wherein R' is $F(CF_2)_m$ or R where $m$ is from one to three; and wherein the total percent by weight of units present in the copolymer is 100 percent.

11. The copolymer of claim 10 wherein $R_f$ in the units defined in part (a) of claim 10 has the formula $F(CF_2)_s$ wherein $s$ is a cardinal number of four to fourteen.

12. The copolymer of claim 11 wherein $s$ in the formula $F(CF_2)_s$ has the numerical values 6, 8, 10, 12 and 14 present in a weight ratio of 35/30/18/8/3.

13. The copolymer of claim 12, said copolymer having an inherent viscosity as 0.5% solutions in trichlorotrifluoroethane at 30° C. of less than 0.8.

14. The copolymer of claim 13 wherein the units defined in part (b) are derived from $ROCH=CH_2$.

15. The copolymer of claim 14 wherein the R group of $ROCH=CH_2$ is $CF_3CH_2-$.

16. The copolymer of claim 10 wherein the units defined in part (b) are derived from $ROCH=CH_2$.

17. The copolymer of claim 16, said copolymer having an inherent viscosity as 0.5% solutions in trichlorotrifluoroethane at 30° C. of less than 0.8.

18. The copolymer of claim 17 wherein the R group of $ROCH=CH_2$ is $CF_3CH_2-$.

19. A textile fabric treated with the copolymer of claim 1.

20. A textile fabric treated with the copolymer of claim 10.

21. Paper treated with the copolymer of claim 1.

22. Paper treated with the copolymer of claim 10.

References Cited

UNITED STATES PATENTS

| | | | |
|---|---|---|---|
| 2,991,277 | 7/1961 | Schildknecht | 260—86.1 |
| 3,102,103 | 8/1963 | Ahlbrecht et al. | 260—86.1 |
| 3,282,905 | 11/1966 | Fasick et al. | 260—86.1 |
| 3,347,812 | 10/1967 | De Marco et al. | 260—86.1 |
| 3,378,609 | 4/1968 | Fasick et al. | 260—86.1 |
| 3,384,627 | 5/1968 | Anello et al. | 260—86.1 |
| 3,459,696 | 8/1969 | Read | 260—86.1 |

HARRY WONG, JR., Primary Examiner

U.S. Cl. X.R.

117—121, 138.8, 139.5, 140, 145, 155, 161; 260—29.6, 45.9, 80.72, 80.73, 86.1, 486

PO-1050
(5/69)

UNITED STATES PATENT OFFICE
CERTIFICATE OF CORRECTION

Patent No. 3,546,187     Dated December 8, 1970

Inventor(s) Thomas K. Tandy, Jr.

It is certified that error appears in the above-identified patent and that said Letters Patent are hereby corrected as shown below:

In claim 1, part (1), a single bond should follow the formula $X(CF_2)_n CH_2$ and should appear as -- $X(CF_2)_n CH_2-$ --.

In claim 1, part (4), "wherein $R^2$ ... ." should pertain to all of the claim, not only "mixtures of the above".

In claim 10, part (1), a single bond should follow the formula $X(CF_2)_n CH_2$ and should appear as -- $X(CF_2)_n CH_2-$ --.

Signed and sealed this 23rd day of March 1971.

(SEAL)
Attest:

EDWARD M. FLETCHER, JR.
Attesting Officer

WILLIAM E. SCHUYLER, JR.
Commissioner of Patents